United States Patent [19]

Tamura et al.

[11] Patent Number: 4,833,357
[45] Date of Patent: May 23, 1989

[54] ROTOR FOR MINIATURE MOTORS

[75] Inventors: Hideo Tamura; Hisashi Shibata, both of Matsudo, Japan

[73] Assignee: Mabuchi Motor Co., Ltd., Japan

[21] Appl. No.: 160,691

[22] Filed: Feb. 26, 1988

[30] Foreign Application Priority Data

Feb. 27, 1987 [JP] Japan ................................. 62-44381

[51] Int. Cl.$^4$ ........................................... H01R 39/46
[52] U.S. Cl. .................................... 310/221; 310/236; 310/40 MM
[58] Field of Search ................. 310/40 MM, 220, 221, 310/233, 235, 236

[56] References Cited

U.S. PATENT DOCUMENTS

| | | | |
|---|---|---|---|
| 3,487,248 | 12/1969 | Kaneko et al. | 310/220 |
| 3,488,538 | 1/1970 | Hayashi | 310/220 |
| 4,420,704 | 12/1983 | Mabuchi | 310/220 |
| 4,521,710 | 6/1985 | Mabuchi | 310/234 |
| 4,584,498 | 4/1986 | Strobl | 310/236 |
| 4,734,607 | 3/1988 | Ikawa et al. | 310/233 |

Primary Examiner—William M. Shoop, Jr.
Assistant Examiner—Marc S. Hoff
Attorney, Agent, or Firm—McGlew & Tuttle

[57] ABSTRACT

A rotor for miniature motors having an annular spark-quenching element for suppressing electrical sparks generated between commutator segments and brushes, in which the commutator segment is composed of a commutating portion coming into sliding contact with the brushes, and a terminal portion connected to a lead wire of a rotor winding; the terminal portion having an element-retaining portion on which the annular spark-quenching element is mounted; and the annular spark-quenching element being electrically connected to the element-retaining portion, as mounted thereon.

8 Claims, 2 Drawing Sheets

FIG. IA
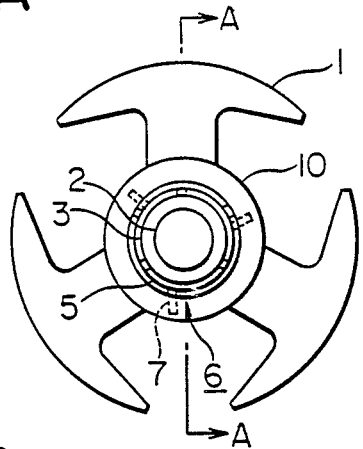
FIG. IB
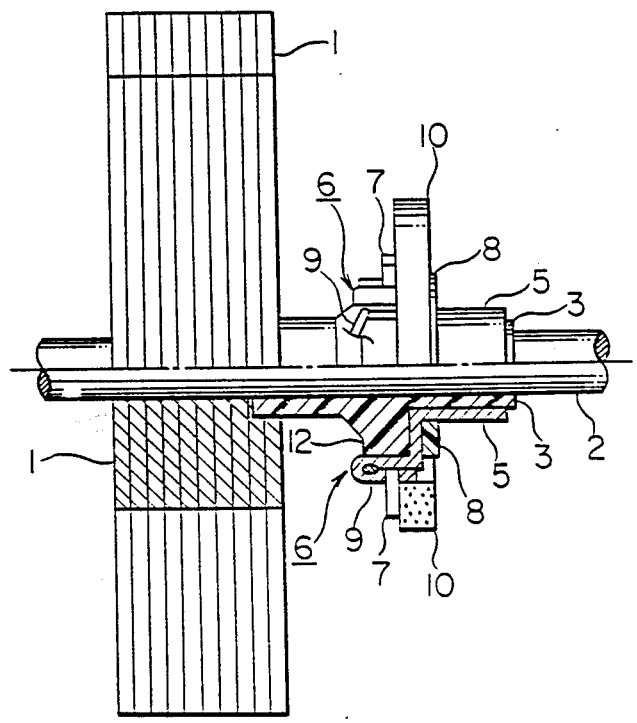

ROTOR FOR MINIATURE MOTORS

BACKGROUND OF THE INVENTION

This invention relates generally to a rotor for miniature motors, and more particularly to a rotor for miniature motors having an annular spark-quenching element for suppressing electrical sparks generated between a motor commutator and brushes which will enable the spark-quenching element to be easily installed and electrically connected by providing on the terminal portion of the commutator an element-retaining portion to which the spark-quenching element is fixedly fitted by resistance welding.

DESCRIPTION OF THE PRIOR ARTS

In a miniature motor is which power is fed to rotor windings through a commutator coming into sliding contact with brushes to which d-c current is fed, electrical sparks generated between the brushes and the commutator tend to produce unwanted electrical noise and facilitate the wear of the cummutator and the brushes, reducing the service life of the miniature motor. To overcome this problem, an arrangement is known in which an annular spark-quenching element (a ring-shaped resistor, variator, for example) is connected among commutator segments.

The spark-quenching element is usually electrically connected to the commutator by soldering or bonding using an electrically conductive adhesive. Because of the extremely delicate nature of the commutator, the spark-quenching element and other components of a miniature motor, installation of such components requires a high degree of skill, leading to poor working efficiency and the difficulty in labor saving. The varister, in particular, involves quality problems because, when locally heated, it tends to cause cracks.

SUMMARY OF THE INVENTION

This invention is intended to overcome these problems.

It is an object of this invention to provide a rotor for miniature motors having an annular spark-quenching element for suppressing electrical sparks generated between commutator segments and brushes, in which the commutator segment is composed of a commutating portion coming in sliding contact with the brushes, and a terminal portion connected to a lead wire of a rotor winding; the terminal portion having an element-retaining portion on which the annular spark-quenching element is mounted; and the spark-quenching element being electrically connected to the element-retaining portion as mounted thereon.

It is another object of this invention to provide a rotor for miniature motors in which the terminal portion has an integrally formed neck portion that is bent 180° for electrically connecting the lead wire of the rotor winding by resistance welding.

It is a further object of this invention to provide a rotor for miniature motors in which the element-retaining portion is provided in a direction normal to the motor shaft by bending the terminal portion so as to electrically connect the spark-quenching element.

It is a further object of this invention to provide a rotor for miniature motors in which the element-retaining portion and the terminal portion are pretreated by solder coating.

It is a further object of this invention to provide a rotor for miniature motors in which an annular varister is used as the spark-quenching element.

It is a further object of this invention to provide a rotor for miniature motors in which a ring resistor is used as the spark-quenching element.

It is a further object of this invention to provide a rotor for miniature motors having a molded commutator in which commutator segments are integrally formed with an insulating member made of a synthetic resin.

These and other objects and advantages of this invention will become apparent from the following detailed description considered together with FIGS. 1A and 1B and FIGS. 2A and 2B.

BRIEF DESCRIPTION OF THE DRAWINGS

FIG. 1 illustrates an embodiment of this invention; FIG. 1A being a front view and FIG. 1B a partially enlarged cross-sectional view of the embodiment, taken along line A—A in FIG. 1A.

DETAILED DESCRIPTION OF THE EMBODIMENT

Figure 2A:
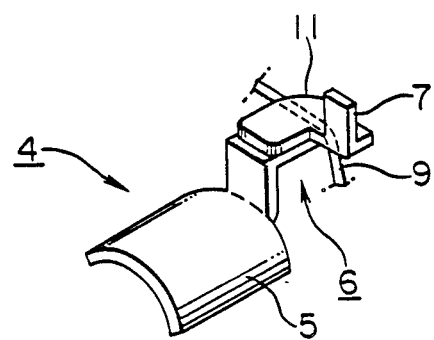
FIG. 2A being a perspective view and FIG. 2B a developed view of the commutator.

In the figures, reference numeral 1 refers to a rotor iron core; 2 to a motor shaft; 3 to an insulating cylinder; 4 to a commutator segment; 5 to a commutating portion; 6 to a terminal portion; 7 to an element-retaining portion; 8 to an insulating washer; 9 to a lead wire; 10 to a varister; 11 to a neck portion; and 12 to an insulating flange, respectively.

Prior to the description of the embodiment shown in FIG. 1, a commutator segment 4 used to the embodiment shown in FIG. 1 will be described, referring to FIG. 2. The commutator segment 4 used in the embodiment shown in FIG. 1 has substantially the same construction as the commutator segment disclosed in the previous invention by the present Applicant, entitled "Commutator Device for Miniature Motors" (Japanese Utility Model Application No. 114086 of 1981), on which a patent was granted. That is, The lead wire 9 of the rotor winding is fused to the terminal portion 6 by resistance welding in such a manner that the lead wire 9 is held by the bent part of the terminal portion 6, as shown in FIG. 2A. Also as shown in FIG. 2B which is a developed view of the commutator segment 4, the lead wire 9 is more effectively fused to the terminal portion 6 by providing a neck portion 11 on the terminal portion 6.

Figure 2B:
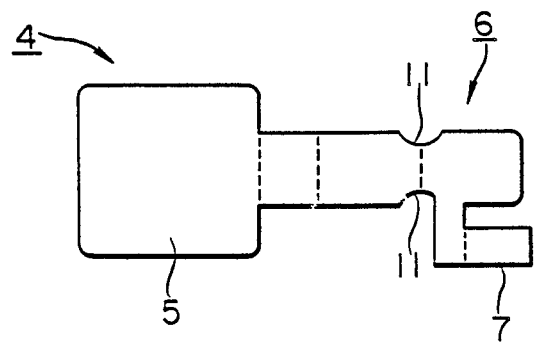
FIG. 2 is a diagram of assistance in explaining a commutator used in the embodiment shown in FIG. 1.

In the commutator segment used in the embodiment of this invention shown in FIG. 1, the element-retaining portion 7 is provided integrally with the terminal portion 6, as shown in FIG. 2B, FIG. 2A shows the state where the commutator segment 4 is bent at locations shown by dotted lines in FIG. 2B; the neck portion shown in FIG. 2B being bent 180°.

The embodiment of this invention shown in FIG. 1 has a motor shaft 2, a rotor iron core 1 fixedly fitted to the motor shaft 2, to which an insulating cylinder 3 is also fixedly fitted. The insulating cylinder 3 has integrally formed a radially outwardly extending insulating flange 12 that protrudes in such a fashion as to form a surface almost perpendicularly to the motor shaft 2. Furthermore, the commutator segment 4 shown in FIG.

2A is fixedly fitted to the insulating cylinder 3 by disposing the commutator segment 4 in such a manner that the commutating portion 5 comes in contact with the insulating cylinder 3, and that the terminal portion 6 comes in contact with the insulating flange 12, and fitting the insulating washer 8 to the commutating portion 5 of the commutator segment 4. On the commutator segment 4 provided in a direction normal to the motor shaft 2 is an element-retaining portion 7, on which a ring-shaped spark-quenching varistor 10 is mounted in such a manner as to come in contact with the element-retaining portion 7. The element-retaining portion 7 is electrically connected to the varistor 10 by an appropriate joining means, such as soldering.

In the foregoing, the construction of the embodiment shown in FIG. 1 has been described. In the state where the commutator segment 4 is disposed on the insulating cylinder 3 in the course of assembly into the completed state shown in FIG. 1, the neck portion 11 (shown in FIG. 2) of the terminal portion 6 is half bent (into a U shape, for example) so as to accommodate the lead wire 9 of the rotor winding (not shown) wound on the rotor iron core 1. Consequently, the lead wire 9 is electrically connected to the terminal portion 6 by inserting the lead wire 9 into the bent part of the neck portion 11 and fusing the lead wire to the terminal portion 6 by resistance welding in a state where the commutator segment 4 is held in position on the insulating cylinder 3.

The fusing operation by resistance welding means that the terminal portion 6 is bent to secure the lead wire 9, and voltage is applied with an electrode rod (not shown) forced onto the terminal portion 6. The heat generated by the current flowing in the terminal portion 6 as a result of voltage application fuses together the lead wire 9 and the terminal portion 6.

In general, the above mentioned fusing operation by resistance welding has an advantage that it lends itself to automation. But, at the same time, it has a disadvantage of poor electrical conductivity. The poor electrical conductivity associated with the fusing operation by resistance welding is largely due to poor contact between the lead wire 9 and the terminal portion 6. To eliminate the cause of this shortcoming, it is conceived to increase both the current value flowing in the terminal portion 6 and the pressure with which the electrode rod is forced onto the terminal portion 6. This could result not only in deformation in the insulating cylinder 3, the insulating flange 12, etc., but also in breakage of the lead wire 9.

This invention is intended to solve the aforementioned problems associated with the fusing operation by reducing the width or thickness of the part of the terminal portion 6 onto which the lead wire 9 is forced so as to form an area having a large electrical resistance, or the neck portion 11. By forming the neck portion 11, not only the terminal portion 6 can be easily bent, but also desired heat can be obtained with a small current value, limiting the heated area to a small range. This helps prevent poor contact between the terminal portion 6 and the lead wire 9, and deformation by heat of the insulating cylinder 3 as well.

In the embodiment shown in FIG. 1, the varister 10 can be easily mounted on the element-retaining portion 7 since the element-retaining portion 7 is provided integrally with the terminal portion 6 in a direction normal to the motor shaft 2. By subjecting the terminal portion 6 and the element-retaining portion 7 in advance to pretreatment, such as solder coating, the soldering of the varister 10 to the element-retaining portion 7 and the fusing of the lead wire 9 to the terminal portion 6 can be further facilitated. In addition, the soldering of the varister 10 to the element-retaining portion 7 can also be performed simultaneously. Although the embodiment shown in FIG. 1 uses a varister as the spark-quenching element, the same holds true when a ring resistor is used as the spark-quenching element.

Needless to say, this invention can be applied to a so-called molded commutator in which commutator segments are integrally formed with an insulating member made of a synthetic resin.

As described above, this invention makes it possible to provide a rotor for miniature motors having an annular spark-quenching element for suppressing electrical sparks generated between the commutator and the brushes in which the spark-quenching element can be easily installed and electrically connected by providing on the terminal portion of the commutator an element-retaining portion to which the spark-quenching element is fitted and fused.

What is claimed is:

1. A rotor for miniature motors having an annular spark-quenching element for suppressing electrical sparks generated between commutator segments and brushes, each said commutator segment being a one-piece structure comprising a commutating portion for contact with said brushes and a terminal portion with a neck portion bent through 180° and electrically connected to a lead wire of a rotor winding; said terminal portion having an element-retaining portion formed by bending said terminal portion to extend radially of the rotor axis; and being electrically connected to any one surface of said element-retaining portion thereby to hold said spark-quenching element in position thereon.

2. A rotor for miniature motors as claimed in claim 1 wherein said terminal portion is electrically connected to said rotor winding lead wire by resistance welding.

3. A rotor for miniature motors as claimed in claim 1 wherein said element-retaining portion and said terminal portion are subjected to pretreatment, by solder coating.

4. A rotor for miniature motors as claimed in claim 1 wherein an annular varistor is used as said spark-quenching element.

5. A rotor for miniature motors as claimed in claim 1 wherein a ring resistor is used as said spark-quenching element.

6. A rotor for miniature motors as claimed in claim 1 wherein a molded commutator is constructed by forming said commutator segments integrally with an insulating member made of a synthetic resin.

7. A rotor for miniature motors having an annular spark-quenching element for suppressing electrical sparks generated between motor commutator segments and motor brushes comprising:
   a motor shaft;
   a rotor core fitted on the motor shaft;
   an insulating cylinder fitted on the motor shaft adjacent the core, the cylinder being integrally formed with a radially extending flange and an axially extending supporting portion;
   each commutator segment being stamped and formed in one-piece from sheet material with a part cylindrical commutating portion, a terminal portion extending from one axial end of the commutating portion and an element retaining portion;

the terminal portion having a first part stepped radially outwardly from the commutating portion and a second part extending axially away from the commutating part and being reversely bent through 180° at an axial end to provide a rotor winding lead wire connecting portion and the element retaining portion comprising a first tab portion extending laterally from the reversely bent second part and a second tab portion bent to extend perpendicularly of the first tab portion, radially outwardly of the motor shaft;

an insulating washer seated against adjacent portions of the commutating portion and the first, stepped part of the terminal portion thereby fitting each commutator segment on the insulating cylinder with the commutating portion supported by the supporting portion and the stepped and axial ends extending respectively radially and axially across the radially extending flange;

and, the annular spark-quenching element being electrically connected to the element retaining portion mounted thereon with a radially inner axially extending surface engaging the outer surface of the first, laterally extending tab portion and a radially extending surface engaging the second, radially outwardly extending tab portion.

8. A rotor according to claim 7 wherein said element-retaining portion and said terminal portion have a pretreatment of solder coating.

* * * * *